United States Patent
Ellenbeck et al.

(10) Patent No.: US 12,336,035 B2
(45) Date of Patent: Jun. 17, 2025

(54) ELECTRONIC DEVICES WITH ADAPTIVE DEVICE-TO-DEVICE COMMUNICATION SWITCHING

(71) Applicant: Apple Inc., Cupertino, CA (US)

(72) Inventors: Jan K. Ellenbeck, Gruenwald (DE); Biljana Badic, Munich (DE); Christian Drewes, Germering (DE)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 18/328,621

(22) Filed: Jun. 2, 2023

(65) Prior Publication Data
US 2023/0328823 A1    Oct. 12, 2023

Related U.S. Application Data

(63) Continuation of application No. 17/481,214, filed on Sep. 21, 2021, now Pat. No. 11,723,097.

(51) Int. Cl.
*H04W 76/15* (2018.01)
*H04W 4/70* (2018.01)
*H04W 28/02* (2009.01)
*H04W 36/22* (2009.01)

(52) U.S. Cl.
CPC ............ *H04W 76/15* (2018.02); *H04W 4/70* (2018.02); *H04W 28/0263* (2013.01); *H04W 36/22* (2013.01)

(58) Field of Classification Search
CPC ... H04W 76/15; H04W 4/70; H04W 28/0263; H04W 36/22

USPC .......................................................... 370/329
See application file for complete search history.

(56) References Cited

U.S. PATENT DOCUMENTS

| | | |
|---|---|---|
| 7,149,533 B2 | 12/2006 | Laird et al. |
| 7,466,986 B2 | 12/2008 | Halcrow et al. |
| 7,532,898 B2 | 5/2009 | Halcrow et al. |
| 8,103,445 B2 | 1/2012 | Smith et al. |
| 8,665,847 B2 | 3/2014 | Holostov et al. |
| 8,930,458 B2 | 1/2015 | Lewis |

(Continued)

FOREIGN PATENT DOCUMENTS

| | | |
|---|---|---|
| CN | 106465320 A | 2/2017 |
| CN | 109328439 A | 2/2019 |

(Continued)

*Primary Examiner* — Mark G. Pannell
(74) *Attorney, Agent, or Firm* — Treyz Law Group, P.C.; Michael H. Lyons (57) ABSTRACT

A communications network may include a relay device that receives device-to-device (D2D) signals. In an ad hoc mode, the relay may consume relatively little power while receiving relatively few messages from relatively few transmitting devices in the D2D signals. In an organized mode, the device may consume relatively high power while receiving many messages from many transmitting devices in the D2D signals. A receiver on the device may transition from the ad hoc mode to the organized mode in response to a first criterion and may transition from the organized mode to the ad hoc mode in response to a second switching criterion. This may allow the device to balance communications load and power consumption while relaying messages such as emergency messages received over D2D signals given that the signals may arrive rarely or in clusters due to an unforeseen event.

20 Claims, 5 Drawing Sheets

(56) References Cited

U.S. PATENT DOCUMENTS

| | | |
|---|---|---|
| 11,723,097 B2 * | 8/2023 | Ellenbeck .............. H04W 4/70 370/329 |
| 2007/0216572 A1 | 9/2007 | Schnabel |
| 2009/0005061 A1 | 1/2009 | Ward et al. |
| 2009/0291630 A1 | 11/2009 | Dunn et al. |
| 2009/0325479 A1 | 12/2009 | Chakrabarti et al. |
| 2010/0002582 A1 | 1/2010 | Luft et al. |
| 2010/0167743 A1 | 7/2010 | Palanki et al. |
| 2010/0191992 A1 | 7/2010 | Shen et al. |
| 2011/0124312 A1 | 5/2011 | Kwon et al. |
| 2013/0017802 A1 | 1/2013 | Adibi et al. |
| 2014/0155019 A1 | 6/2014 | Schwartz et al. |
| 2014/0328329 A1 | 11/2014 | Novlan et al. |
| 2015/0029866 A1 | 1/2015 | Liao et al. |
| 2015/0215903 A1 | 7/2015 | Zhao et al. |
| 2015/0230180 A1 | 8/2015 | Lim et al. |
| 2016/0204847 A1 | 7/2016 | Ryu et al. |
| 2016/0337889 A1 | 11/2016 | Jung et al. |
| 2017/0325167 A1 | 11/2017 | Lu et al. |
| 2018/0279091 A1 | 9/2018 | Boesen et al. |
| 2018/0288822 A1 | 10/2018 | Lee et al. |
| 2019/0297506 A1 | 9/2019 | Shoshan et al. |
| 2019/0342147 A1 | 11/2019 | O'Reirdan et al. |
| 2020/0053647 A1 | 2/2020 | Chae et al. |
| 2021/0044473 A1 | 2/2021 | Kim et al. |
| 2021/0144659 A1 | 5/2021 | Wu et al. |
| 2022/0022077 A1 | 1/2022 | Maganti et al. |
| 2022/0346118 A1 | 10/2022 | Wu et al. |
| 2023/0013335 A1 | 1/2023 | Ellenbeck et al. |

FOREIGN PATENT DOCUMENTS

| | | |
|---|---|---|
| CN | 110769496 A | 2/2020 |
| CN | 111819888 A | 10/2020 |

* cited by examiner

ELECTRONIC DEVICES WITH ADAPTIVE DEVICE-TO-DEVICE COMMUNICATION SWITCHING

This application is a continuation of U.S. patent application Ser. No. 17/481,214, filed Sep. 21, 2021, which is hereby incorporated by reference herein in its entirety.

FIELD

This disclosure relates generally to wireless communications, including wireless communications performed by user equipment devices.

BACKGROUND

Communications systems often include user equipment and wireless base stations. The wireless base stations have corresponding coverage areas. When the user equipment is located within a coverage area, radio-frequency signals are exchanged between the user equipment and a wireless base station to convey wireless data.

In practice, there arise situations where the user equipment is no longer within the coverage areas of the wireless base stations. In these situations, the user equipment is unable to convey wireless data with the wireless base stations. However, scenarios may still arise where the user equipment needs to send wireless data to a recipient while the user equipment is located outside of the coverage areas of the wireless base stations.

SUMMARY

A communications network may include user equipment (UE) devices and external communications equipment such as wireless base stations, access points, or communications satellites. A relay device in range of the external communications equipment may have wireless circuitry with a receiver, transmitter, and one or more antennas. The relay device may receive device-to-device (D2D) signals from one or more transmitting devices. The relay device may be operable in an ad hoc operating mode and in an organized operating mode. In the ad hoc operating mode, the relay device may consume relatively little power while receiving relatively few messages from relatively few transmitting devices in the D2D signals. In the organized operating mode, the relay device may consume relatively high power while receiving many messages from many transmitting devices in the D2D signals.

One or more processors may transition the receiver from the ad hoc operating mode to the organized operating mode in response to a first switching criterion and may transition the receiver from the organized operating mode in response to a second switching criterion. One or more devices may transmit synchronization signals while in the organized operating mode. Transmission of the synchronization signals may be handed off to other devices. One or more of the transmit devices may transmit a beacon in the D2D signals when an emergency message needs to be transmitted.

The first switching criterion may be reception of the beacon at the relay device, reception of a user-specific paging signal at the relay device, D2D traffic level exceeding a threshold value at the relay device, the occurrence of other user-specific events, etc. The second switching criterion may be the end of a specific communications session, D2D traffic level falling below a threshold value at the relay device, reception of a particular signal from one of the transmit devices, the passage of a predetermined amount of time without reception of additional messages, etc. This may allow the relay device to balance communications load and power consumption while relaying messages such as emergency messages received over D2D signals given that the D2D signals may arrive rarely or in clusters due to the occurrence of an unforeseen event.

An aspect of the disclosure provides a user equipment device. The user equipment device can include one or more antennas. The user equipment device can include wireless circuitry configured to receive device-to-device (D2D) signals from one or more additional user equipment devices over the one or more antennas and configured to transmit one or more messages from the D2D signals to external communications equipment over the one or more antennas. The user equipment device can include one or more processors. The one or more processors may be configured to operate the wireless circuitry in a first operating mode in which the receiver consumes a first amount of power and supports a first service level and in a second operating mode in which the wireless circuitry consumes a second amount of power that is higher than the first amount of power and supports a second service level that is higher than the first service level. The one or more processors may be configured to switch the wireless circuitry from the first operating mode to the second operating mode in response to a first switching criterion. The one or more processors may be configured to switch the wireless circuitry from the second operating mode to the first operating mode in response to a second switching criterion.

An aspect of the disclosure provides a method of operating a user equipment device to relay emergency messages in device-to-device (D2D) signals received from one or more additional user equipment devices to external communications equipment. The method can include with a receiver, receiving the D2D signals in a first operating mode that consumes a first amount of power. The method can include with one or more processors, transitioning the receiver from the first operating mode to a second operating mode in response to a first trigger condition. The method can include with the receiver, receiving the D2D signals in a second operating mode that consumes a second amount of power greater than the first amount of power. The method can include with the one or more processors, transitioning the receiver from the second operating mode to the first operating mode in response to a second trigger condition.

An aspect of the disclosure provides an electronic device. The electronic device can include wireless circuitry configured to receive device-to-device (D2D) signals and configured to relay emergency messages in the D2D signals to external communications equipment. The electronic device can include one or more processors. The one or more processors can be configured to operate the wireless circuitry in an ad hoc operating mode in which a receiver in the wireless circuitry is active for a first amount of time and consumes a first amount of power and in an organized operating mode in which the receiver is active for a second amount of time greater than the first amount of time and consumes a second amount of power greater than the first amount of power, the wireless circuitry being configured to receive the D2D signals from a first set of additional electronic devices in the ad hoc operating mode. The one or more processors can be configured to switch the receiver from the first operating mode to the second operating mode when the D2D signals are received from a second set of additional electronic devices having more additional electronic devices than the first set of additional electronic devices.

DETAILED DESCRIPTION

Figure 1:
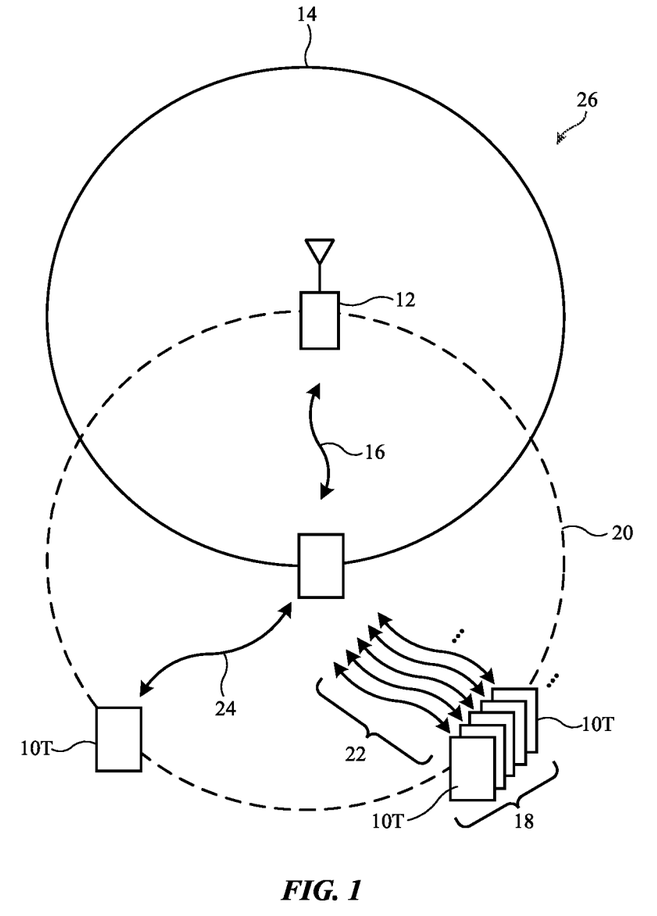
FIG. 1 is a diagram of an illustrative communications network having user equipment devices and external communications equipment such as a wireless base station or access point in accordance with some embodiments.

FIG. 1 is a schematic diagram of an illustrative communications system 26 (sometimes referred to herein as communications network 26) for conveying wireless data between communications terminals. Communications system 26 may include network nodes (e.g., communications terminals). The network nodes may include user equipment (UE) such as one or more UE devices 10. The network nodes may also include external communications equipment (e.g., communications equipment other than UE devices 10) such as external communications equipment 12. External communications equipment 12 may include a wireless base station, a wireless access point, or a communications satellite (e.g., a communications satellite in a satellite constellation that routes bidirectional or unidirectional wireless communications between UE devices and a satellite gateway or ground station in one or more satellite communications frequency bands), as examples. UE devices 10 and external communications equipment 12 may communicate with each other using wireless communications links. If desired, UE devices 10 may wirelessly communicate with external communications equipment 12 without passing communications through any other intervening network nodes in communications system 26 (e.g., UE devices 10 may communicate directly with external communications equipment 12 over-the-air).

Communications system 26 may form a part of a larger communications network that includes network nodes coupled to external communications equipment 12 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in the larger communications network via external communications equipment 12 (e.g., external communications equipment 12 may serve as an interface between user equipment devices 10 and the rest of the larger communications network). Some or all of the communications network may, if desired, be operated by a corresponding network operator or service provider.

External communications equipment 12 may include one or more antennas that provides wireless coverage for UE devices 10 located within a corresponding geographic area or region such as cell 14. The size of cell 14 may correspond to the maximum transmit power level of external communications equipment 12 and the over-the-air attenuation characteristics for radio-frequency signals conveyed by external communications equipment 12, for example. When a UE device 10 is located within cell 14, the UE device may communicate with external communications equipment 12 over a wireless link. To support the wireless link, external communications equipment 12 may transmit radio-frequency signals in a downlink (DL) direction from external communications equipment 12 to the UE device and/or the UE device may transmit radio-frequency signals in an uplink (UL) direction from the UE device to external communications equipment 12. In the example of FIG. 1, a first UE device 10 such as UE device 10R may be located within cell 14. UE device 10R may therefore communicate with external communications equipment 12 over a corresponding wireless link. Radio-frequency signals 16 may be conveyed between UE device 10R and external communications equipment 12 to support the wireless link.

In practice, situations may arise where one or more UE devices such as UE devices 10T are outside of the coverage area of external communications equipment 12 and the coverage area for any other wireless access points or base stations in communications system 26. While outside of the coverage area of external communications equipment 12, UE devices 10T may sometimes be referred to as being "off-grid." UE devices 10T may also be off-grid when external communications equipment 12 is inactive, disabled, overloaded, or otherwise unavailable to communicate with UE devices (e.g., due to a power outage or other disability at external communications equipment 12, due to a disaster or other emergency situation, due to network load balancing, due to excessive traffic at external communications equipment 12 due to a disaster or other emergency situation at the location of the UE devices or due to an excessive number of UE devices attempting to access the network, due to access to the rest of the communications network 26 being blocked or denied to UE devices by the network service provider, governmental entities, and/or other actors, due to intervening obstacles, terrain, or weather blocking the UE devices from conveying radio-frequency signals with external communications equipment 12, etc.). Conversely, UE devices such as UE device 10R may sometimes be referred to as being "on-grid" when the UE device is within a coverage area such as cell 14 and is able to convey wireless data with the rest of the network (e.g., communications system 26) via external communications equipment 12.

When UE devices 10T are located off-grid, UE devices 10T may still need to provide wireless data such as message data, voice data, video data, or other data to a communications terminal in communications system 26 or to another UE device. For example, the user of UE device 10T may encounter an emergency while off-grid and may need to use UE device 10T to send an emergency message to the authorities (e.g., emergency services) and/or another person to alert the authorities and/or another person to the user's situation and/or to call for help.

While off-grid, UE devices 10T may still be able to convey radio-frequency signals with other UE devices such as UE device 10R (e.g., over a wireless device-to-device (D2D) link). UE device 10R may have its own coverage area 20. The size of coverage area 20 is determined by the maximum transmit power level of UE device 10R and the over-the-air attenuation characteristics for radio-frequency signals transmitted by UE device 10R. When the user of UE device 10T needs to send an emergency message while off-grid, UE device 10T may transmit radio-frequency signals 24 that include an emergency message or other wireless data. UE device 10R may receive radio-frequency signals 24 and thus the emergency message transmitted by UE device 10T. UE device 10R may then serve as a relay for the emergency message by conveying the emergency message to external communications equipment 12 over radio-frequency signals 16. External communications equipment 12 may be managed by emergency services or may further relay the message to other network nodes operated by emergency services (e.g., a "911" service in the United States) or to other users.

UE device 10R may therefore sometimes be referred to herein as relay device 10R. UE devices 10T, which transmit messages for relay to external communications equipment 12 via relay device 10R, may sometimes be referred to herein as transmit devices 10T. In situations where relay device 10R is located outside of cell 14, relay device 10R may relay the message to one or more additional relay device 10R (e.g., using D2D signals) until the message is received by a relay device 10R within cell 14.

To relay messages in radio-frequency signals 24 transmitted by transmit device 10T, relay device 10R needs to monitor for incoming messages to be relayed. The wireless receiver in relay device 10R needs to remain powered on and active to monitor for incoming messages. However, emergencies and thus messages in radio-frequency signals 24 are relatively rare. Leaving the wireless receiver powered on may therefore consume an excessive amount of power in relay device 10R (e.g., unnecessarily draining the battery for relay device 10R). To reduce power consumption, relay device 10R may activate its wireless receiver only periodically (e.g., during a relatively long data reception (DRX) cycle). On the other hand, relatively long DRX cycles create high latency and limit the overall wireless resources available at relay device 10R for relaying received D2D messages. This high latency and resource limitation may significantly impair the ability of relay device 10R to relay messages in scenarios where there are many transmit devices 10T that need to transmit messages to the network.

For example, there may be scenarios where many transmit devices 10T such as a set 18 of transmit devices 10T are present within coverage area 20 of relay device 10R and have emergency messages to transmit to the network. The transmit devices 10T in set 18 may concurrently transmit messages to relay device 10R in radio-frequency signals 22 (e.g., D2D signals). Set 18 may include as many as dozens, hundreds, or even thousands of transmit devices. Such scenarios may occur, for example, in crowded places where access to external communications equipment 12 in communications system 26 suddenly becomes unavailable (e.g., due to a natural disaster, severe weather that wirelessly blocks transmit devices 10T, rioting, war, governments or other actors blocking access to the network, etc.). These events occur rarely but in a clustered manner (e.g., where there are many affected transmit devices 10T in close geographic proximity to each other).

Radio-frequency signals 22 and 24 are D2D signals and may therefore sometimes be referred to herein as D2D signals 22 and 24. D2D signals 22 and 24 may form corresponding wireless D2D communications links between transmit devices 10T and relay device 10R. Implementations in which D2D signals 22 and 24 include an emergency message transmitted by transmit devices 10T are merely illustrative and described herein as an example. In general, D2D signals 22 and 24 may include any desired data (e.g., message data, voice data, application data, video data, etc.) for transmission to relay device 10R. Relay device 10R may also transmit D2D signals to transmit devices 10T (e.g., the D2D links may be bidirectional links). D2D signals transmitted to by relay device 10R to transmit devices 10T may include beacon signals, synchronization signals, control signals, and/or other wireless communications data (e.g., message data, voice data, etc.).

Figure 2:
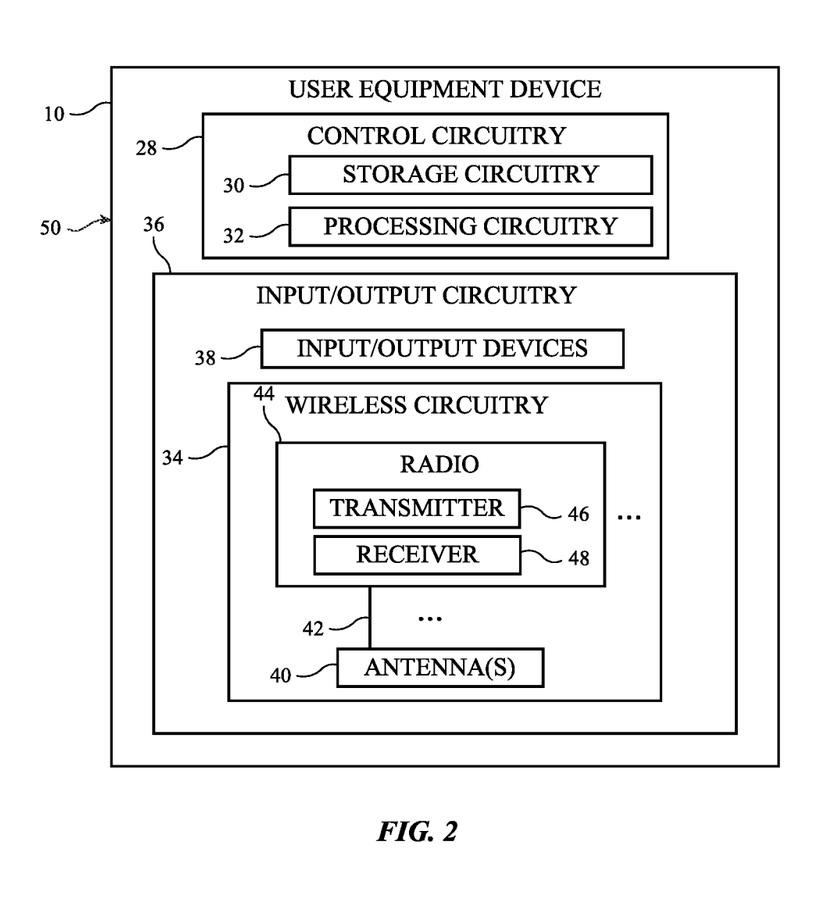
FIG. 2 is a block diagram of an illustrative user equipment device in accordance with some embodiments.

FIG. 2 is a block diagram of an illustrative UE device 10 (e.g., a relay device 10R or a transmit device 10T of FIG. 1). UE device 10 is an electronic device and may therefore sometimes be referred to herein simply as device 10. UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 2, UE device 10 may include components located on or within an electronic device housing such as housing 50. Housing 50, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 50 may be formed from dielectric or other low-conductivity material (e.g., glass, ceramic, plastic, sapphire, etc.). In other situations, housing 50 or at least some of the structures that make up housing 50 may be formed from metal elements.

UE device 10 may include control circuitry 28. Control circuitry 28 may include storage such as storage circuitry 30.

Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 30 may include storage that is integrated within UE device 10 and/or removable storage media.

Control circuitry 28 may include processing circuitry such as processing circuitry 32. Processing circuitry 32 may be used to control the operation of UE device 10. Processing circuitry 32 may include on one or more processors, microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in UE device 10 using hardware (e.g., dedicated hardware or circuitry), firmware, and/or software. Software code for performing operations in UE device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on UE device 10 such as satellite navigation applications, internet browsing applications, voice-over-internet-protocol (VOIP) telephone call applications, email applications, media playback applications, operating system functions, etc. To support interactions with external communications equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

UE device 10 may include input-output circuitry 36. Input-output circuitry 36 may include input-output devices 38. Input-output devices 38 may be used to allow data to be supplied to UE device 10 and to allow data to be provided from UE device 10 to external devices. Input-output devices 38 may include user interface devices, data port devices, and other input-output components. For example, input-output devices 38 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 38 may be peripherals that are coupled to a main processing unit or other portion of UE device 10 via a wired or wireless link).

Input-output circuitry 36 may include wireless circuitry 34 to support wireless communications. Wireless circuitry 34 (sometimes referred to herein as wireless communications circuitry 34) may include one or more antennas 40. Wireless circuitry 34 may also include one or more radios 44. Radio 44 may include circuitry that operates on signals at baseband frequencies (e.g., baseband circuitry) and radio-frequency transceiver circuitry such as one or more radio-frequency transmitters 46 and one or more radio-frequency receivers 48. Transmitter 46 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 40. Receiver 48 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 40. The components of radio 44 may be mounted onto a single substrate or integrated into a single integrated circuit, chip, package, or system-on-chip (SOC) or may be distributed between multiple substrates, integrated circuits, chips, packages, or SOCs.

Antenna(s) 40 may be formed using any desired antenna structures for conveying radio-frequency signals. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, two or more of antennas 40 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna Each radio 44 may be coupled to one or more antennas 40 over one or more radio-frequency transmission lines 42. Radio-frequency transmission lines 42 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 42 may be integrated into rigid and/or flexible printed circuit boards if desired. One or more radio-frequency lines 42 may be shared between multiple radios 44 if desired. Radio-frequency front end (RFFE) modules may be interposed on one or more radio-frequency transmission lines 42. The radio-frequency front end modules may include substrates, integrated circuits, chips, or packages that are separate from radios 44 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 42.

Radio 44 may transmit and/or receive radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

Transmitter 46 may transmit radio-frequency signals over antenna(s) 40 when transmitter 46 is active (e.g., enabled). Transmitter 46 does not transmit radio-frequency signals over antenna(s) 40 when transmitter 46 is inactive (e.g., disabled or not actively transmitting sign). Similarly, receiver 48 may receive radio-frequency signals over antenna(s) 40 when receiver 48 is active (e.g., enabled). Receiver 48 does not receive radio-frequency signals over antenna(s) 40 when receiver 48 is inactive (e.g., disabled). Control circuitry 28 may control transmitter 46 to be active or inactive at any given time. Control circuitry 28 may also control receiver 48 to be active or inactive at any given time. Control circuitry 28 may activate or deactivate transmitter 46 and/or receiver 48 at different times as dictated by a communications protocol governing radio 44 and/or based on instructions provided by a user and/or from other software running on control circuitry 28, for example. Control circuitry 28 may configure transmitter 46 to be inactive by powering off transmitter 46, by providing control signals to switching circuitry on power supply or enable lines for transmitter 46, by providing control signals to control circuitry on transmitter 46, and/or by providing control signals to switching circuitry within transmitter 46, for example. When transmitter 46 is inactive, some or all of transmitter 46 may be inactive (e.g., disabled or powered off) or transmitter 46 may remain powered on but without transmitting radio-frequency signals over antenna(s) 40. Similarly, control circuitry 28 may configure receiver 48 to be inactive by powering off receiver 48, by providing control signals to switching circuitry on power supply or enable lines for receiver 48, by providing control signals to control circuitry on receiver 48, and/or by providing control signals to switching circuitry within receiver 48, for example. When receiver 48 is inactive, some or all of receiver 48 may be disabled (e.g., powered off) or receiver 48 may remain powered on but without actively receiving radio-frequency signals incident upon antenna(s) 40. Transmitter 46 and receiver 48 may consume more power on UE device 10 when active than when inactive (e.g., a battery on UE device 10 may drain more rapidly while transmitter 46 and receiver 48 are active than while transmitter 46 or receiver 48 are inactive).

The example of FIG. 2 is merely illustrative. While control circuitry 28 is shown separately from wireless circuitry 34 in the example of FIG. 1 for the sake of clarity, wireless circuitry 34 may include processing circuitry (e.g., one or more processors) that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio 44. The baseband circuitry may, for example, access a communication protocol stack on control circuitry 28 (e.g., storage circuitry 30) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

When UE device of FIG. 1 is off-grid, the UE device should still be reachable in case the user of the UE device encounters an emergency or otherwise needs to transmit wireless data to another UE device (e.g., relay device 10R of FIG. 1). To maximize the likelihood that another UE device will be able to receive D2D signals (e.g., D2D signals 22 or 24 of FIG. 1), UE device 10 should be able to transmit the D2D signals over a relatively long distance (e.g., it may be desirable for the UE device to have as large a coverage area as possible). This distance (e.g., the radius of coverage area 20 of FIG. 1) may be as far as hundreds of meters, a few km, several km, or dozens of km, for example. UE device 10 may maximize the range of the D2D signals by transmitting at relatively high transmit power levels (e.g., a maximum transmit power level) and for a relatively long amount of time.

In general, UE device 10 may transmit D2D signals at any desired frequencies (e.g., frequencies in an ISM band, an unlicensed band, a band reserved for emergency/public services, etc.). If desired, UE device 10 may transmit D2D signals at relatively low frequencies such as frequencies in a frequency band below 1 GHz, below 2 GHz, below 3 GHz, below 950 MHz, etc. This may serve to minimize over-the-air signal attenuation for the D2D signals, thereby maximizing the size of the coverage area. The wireless circuitry 34 on UE device 10 may include a dedicated radio 44 for transmitting D2D signals or the radio that transmits D2D signals may also transmit other signals associated with other communications protocols or RATs (e.g., a single radio 44 on UE device 10 may convey both WLAN signals and D2D signals, a single radio 44 on UE device 10 may convey both cellular telephone signals and D2D signals, etc.).

At the same time, even when UE device 10 is located within the coverage area of another UE device, the UE device is only able to correctly recover wireless data (e.g., an emergency message) in D2D signals (a) when the receiver 48 on UE device 10 is active and (b) when UE device 10 is time-synchronized with the other UE device 10. For example, while UE relay device 10R of FIG. 1 can keep its receiver 48 active at all times to listen for any D2D signals 22/24 that happen to be transmitted, this would consume an excessive amount of power in relay device 10R, causing relay device 10R to drain its battery relatively quickly. Keeping receiver 48 active at all times is particularly power-inefficient because off-grid UE devices such as transmit devices 10T only need to transmit emergency messages or other wireless data in D2D signals on rare occasions. In addition, while UE devices can synchronize to each other using signals from external communications equipment 12 when located within cell 14 (e.g., the base station can configure sleeping patterns and paging cycles to allow the devices to sleep when able to save power), UE devices that are off-grid such as transmit devices 10T are not previously synchronized to each other (e.g., to relay device 10R) or to a time reference. Even if the UE devices are time-synchronized at one point in time (e.g., while both UE devices are on-grid), the timing for transmit device 10T can drift with respect to the timing for relay device 10R once one or both the UE devices go off-grid. As such, simple paging mechanisms may be insufficient to allow relay device 10R to correctly receive and recover wireless data in D2D signals 22/24.

To allow relay device 10R to minimize power consumption while listening for potential D2D signals 24 from relatively few transmit devices 10T, relay device 10R may periodically activate its receiver 48 during receiver (RX) windows, during which the receiver is able to receive D2D signals 24 (e.g., where the receiver is inactive between the RX windows). When the duration of the RX windows is short, there is a high likelihood that any transmission of D2D signals 24 will arrive at relay device 10R while the receiver is inactive-thereby preventing proper recovery of the data in D2D signals 24 by relay device 10R. When the duration of the RX windows is long, there is a greater likelihood that a transmission of D2D signals 24 will arrive at relay device 10R.

When there are many transmit devices 10T such as the set 18 of transmit devices 10T (FIG. 1) that needs to relay messages to the network via relay device 10R, relay device 10R may need to utilize more power and wireless resources to successfully relay all the messages (e.g., while sacrificing battery) than in scenarios where D2D signals 24 are received from a single transmit device 10T. However, relay device 10R generally has no prior knowledge of when the set 18 of transmit devices 10R will need to relay messages. It may therefore be desirable for relay device 10R to be able to efficiently balance power consumption with communications capacity while allowing relay device 10R to relay sparsely transmitted messages from individual transmit devices 10T (e.g., via radio-frequency signals 24) and while also allowing relay device 10R to relay heavily transmitted messages from a large number of transmit devices such as the transmit devices in set 18 (e.g., via radio-frequency signals 22) when needed.

Figure 3:
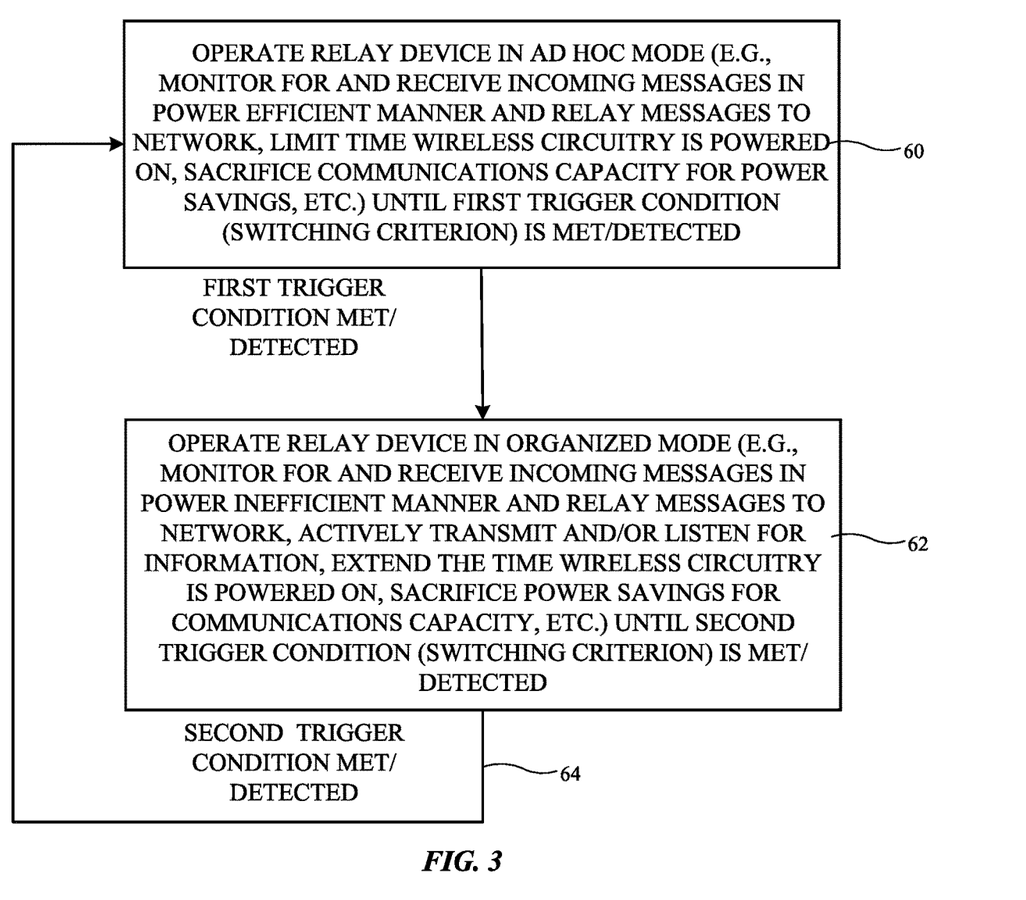
FIG. 3 is a flow chart of illustrative operations involved in using a first user equipment device to relay device-to-device signals from one or more other user equipment devices while balancing power consumption and communications load in accordance with some embodiments.

If desired, relay device 10R may efficiently balance power consumption with communications capacity across both sparse transmissions of D2D signals 24 by relatively few transmit devices 10T and dense transmissions of D2D signals 22 by the set 18 of transmit devices 10T (FIG. 1) by switching between at least first and second operating modes (states). The first operating mode may sometimes be referred to herein as an ad hoc mode. The second operating mode may sometimes be referred to herein as an organized mode. FIG. 3 is a flow chart of illustrative operations that may be performed by relay device 10R to switch between the ad hoc mode and the organized mode.

At operation 60, relay device 10R may operate in the ad hoc mode. In the ad hoc mode, relay device 10R may monitor for and receive incoming messages in D2D signals 24 from transmit device 10T. Relay device 10R may limit the amount of time that receiver 48 is active to conserve power. For example, receiver 48 may be active during a series of relatively short RX windows that are separated by relatively long gaps during which receiver 48 is inactive (e.g., relay device 10R may activate its wireless receiver only periodically and during a relatively long data reception (DRX) cycle). This may allow relay device 10R to receive and relay a relatively small number of messages per unit time from a relatively small number of transmit devices 10R while also minimizing power consumption (e.g., relay device 10R may sacrifice communications capacity for power savings).

As one example, relay device 10R may receive at least a portion of one or more preambles transmitted by transmit device 10T in D2D signals 24 during one of the RX windows during which the receiver 48 on relay device 10R is active. The control circuitry 28 on relay device 10R may process the received preamble to synchronize timing with transmit UE device 10T. For example, relay device 10R may identify (e.g., determine, calculate, compute, generate, produce, etc.) timing for an emergency message listening window during which transmit device 10T will transmit the emergency message (e.g., the emergency message listening window may begin at an initial time that is separated from the end of the one or more preambles by a predetermined time period or offset time). This may serve to time-synchronize relay device 10R to transmit device 10T so relay device 10R will be able to correctly recover the emergency message transmitted by transmit device 10T. If desired, relay device 10R may deactivate receiver 48 after identifying this timing and/or after receipt of the one or more preambles to conserve power. Control circuitry 28 on relay device 10R may re-activate its receiver 48 during the emergency message listening window. The receiver 48 on relay device 10R may receive the emergency message transmitted during the emergency message listening window.

Relay device 10R may perform any desired subsequent processing based on the received emergency message. For example, relay device 10R may alert or inform a user of relay device 10R about the emergency message and/or its contents, may transmit UL signals to external communications equipment 12 informing the network of the emergency message (e.g., when relay device 10R is located within cell 14), may transmit additional D2D signals to another UE device to inform that UE device of the emergency message, etc. Relay device 10R may remain in the ad hoc mode until a first trigger condition or switching criterion is met or detected at relay device 10R. Once the first trigger condition or switching criterion is met, relay device 10R may transition (switch) from the ad hoc mode into the organized mode and processing may proceed to operation 62. Examples of first trigger conditions (switching criteria) that may be used by relay device 10R to transition from the ad hoc mode to the organized mode are discussed in further detail below.

At operation 62, relay device 10R may operate in the organized mode. In the organized mode, relay device 10R may monitor for and receive incoming messages in D2D signals 22 from a set 18 of transmit devices 10T. Relay device 10R may increase or maximize the amount of time that receiver 48 is active to boost communications capacity while sacrificing battery. For example, receiver 48 may be active during a series of relatively long RX windows that are separated by relatively short gaps during which receiver 48 is inactive (e.g., relay device 10R may activate its wireless receiver using a relatively short data reception (DRX) cycle) or may be active for a single continuous extended RX window. This may allow relay device 10R to receive and relay a relatively large number of messages per unit time from a large number of transmit devices 10T (e.g., in set 18).

If desired, in the organized mode, relay device 10R and/or one or more of the transmit devices 10T may actively broadcast communications information to allow other UE devices to efficiently participate in the network. For example, relay device 10R and/or one or more other UE devices may actively broadcast synchronization signals and/or system information (e.g., for a longer period of time and/or over a longer scan than when operating in the ad hoc mode). The synchronization signals may synchronize the sleep and frame structure of each of the UE devices and/or the availability of control and routing information, for example. The UE device that transmits the synchronization signals and/or system information may sometimes be referred to herein as the primary UE device and may be relay device 10R, a UE device having a reliable time reference (e.g., an accurate and recently-verified clock), a UE device that is on-grid, a UE device having a highest battery level, a UE device that is currently connected to a power source, etc. The UE devices that receive the synchronization signals and/or system information may sometimes be referred to herein as secondary UE devices. Relay device 10R may exhibit higher throughput, higher throughput per energy consumed, less latency, higher communications capacity, and higher simultaneous users and connections when operating in the organized mode than in the ad hoc mode.

As one example, in the organized mode, relay device 10R may perform a PHY-centric synchronization with primary/relay PSS transmission, frame structure with fixed discovery, and control slots and a priori synchronization of all users in the system. As another example, in the organized mode, relay device 10R may form a P2P mesh system (e.g., pro-actively exchanging routing and network information with other UE devices). As another example, relay device 10R may use a Wi-Fi neighborhood aware network (NAN) protocol in the organized mode. As yet another example, relay device 10R may implement a self-organizing network in the organized mode. Combinations of these and/or other technologies may also be used. Relay device 10R may omit these communications schemes in the ad hoc mode.

Relay device 10R may perform any desired subsequent processing based on the received emergency messages in the organized mode. For example, relay device 10R may alert or inform a user of relay device 10R about the emergency messages, may transmit UL signals to external communications equipment 12 informing the network of the emergency messages (e.g., when relay device 10R is located within cell 14), may transmit additional D2D signals to another UE device to inform that UE device of the emergency message, etc. Relay device 10R may remain in the organized mode until a second trigger condition or switching criterion is met or detected at relay device 10R. Once the second trigger condition or switching criterion is met, relay device 10R may transition (switch) from the ad hoc mode into the organized mode and processing may loop back to operation 60 via path 64. Examples of second trigger conditions (switching criteria) that may be used by relay device 10R to transition from the organized mode to the ad hoc mode are discussed in further detail below. In this way, relay device 10R may balance power consumption with communications capacity based on the communications needs of the transmit devices 10T in its vicinity.

Figure 4:
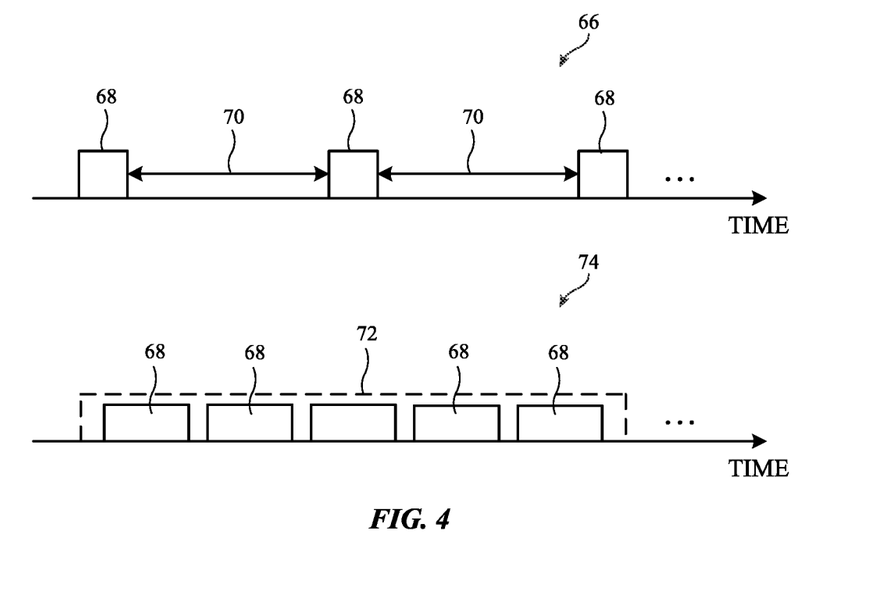
FIG. 4 includes timing diagrams showing how an illustrative first user equipment device may have different levels of receiver activity in an ad hoc mode and in an organized mode in accordance with some embodiments.

FIG. 4 includes timing diagrams showing one example of how relay device 10R may control receiver 48 in the ad hoc mode and in the organized mode. Timing diagram 66 of FIG. 4 plots receiver (RX) timing for relay device 10R in receiving D2D signals from one or more transmit devices 10T while operating in the ad hoc mode. As shown by timing diagram 66, relay device 10R may periodically activate receiver 48 during a series of RX windows 68 to monitor (listen for) D2D signals. RX windows 68 may be relatively short in duration and may be separated by relatively long periods 70 during which receiver 48 is inactive (e.g., asleep or powered off). This may allow relay device 10R to properly receive and process D2D signals from one transmit device 10T or relatively few transmit devices 10T while minimizing power consumption and conserving battery power.

Timing diagram 74 of FIG. 4 plots RX timing for relay device 10R in receiving D2D signals from a set 18 of transmit devices 10T while operating in the organized mode. As shown by timing diagram 74, relay device 10R may periodically activate receiver 48 during a series of RX windows 68 to monitor (listen for) D2D signals. RX windows 68 may be relatively long in duration and may be separated by relatively short periods during which receiver 48 is inactive (e.g., asleep or powered off). If desired, relay device 10R may keep receiver 48 active for an extended and continuous RX window 72. This may allow relay device 10R to properly receive and process D2D signals from many transmit devices 10T to relay messages in the D2D signals to the appropriate parties. The example of FIG. 4 is merely illustrative and in general, any desired receiver timing may be used.

Figure 5:
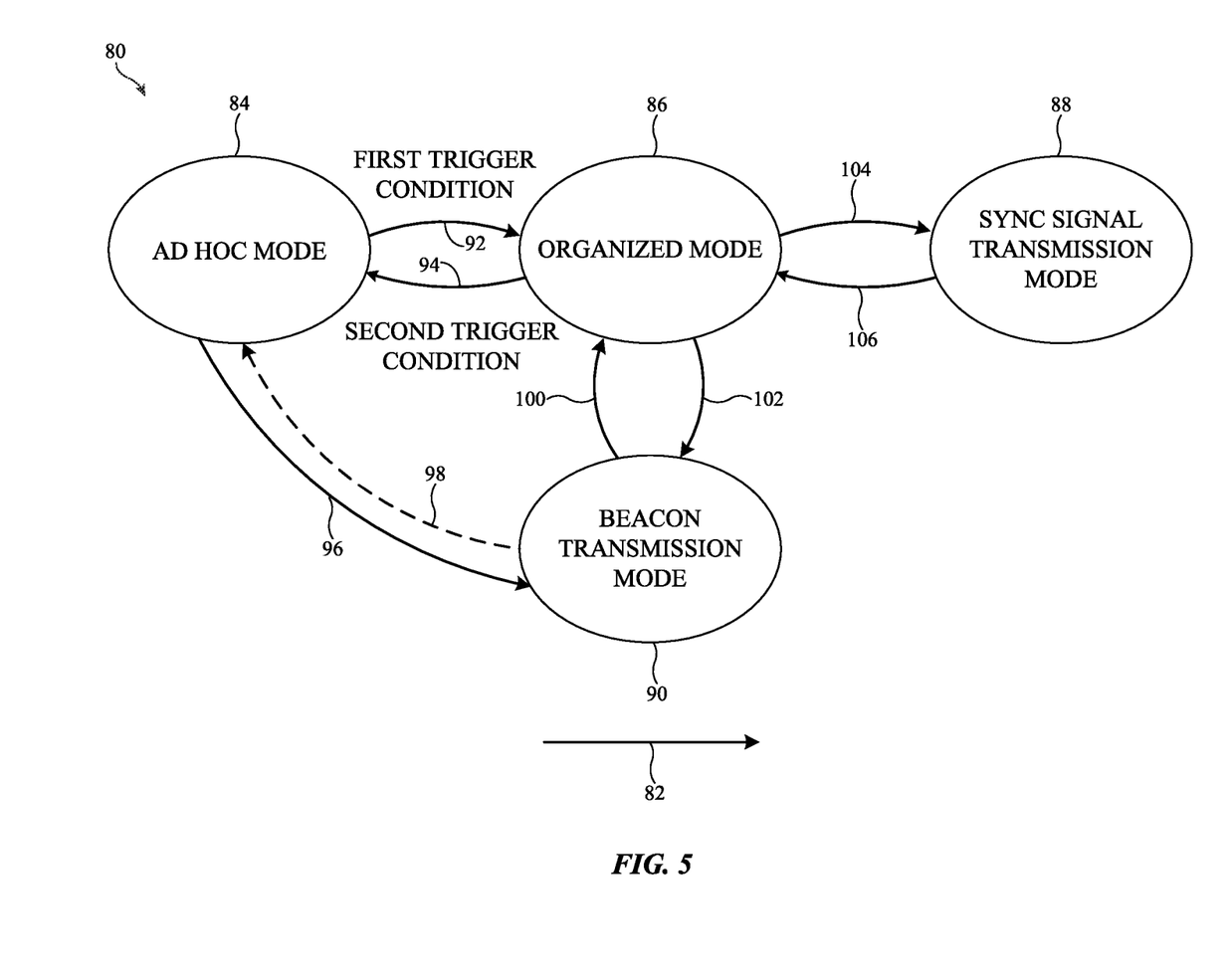
FIG. 5 is a state diagram of illustrative operating modes for a first user equipment device that relays device-to-device signals while balancing power consumption and communications load in accordance with some embodiments.

FIG. 5 shows a state diagram 80 of illustrative operating modes (states) for relay device 10R. Transmit devices 10T may also adjust operation between each of the operating modes (e.g., the operating modes of FIG. 5 may be operating modes of both relay device 10R and transmit devices 10T). As shown in FIG. 5, relay device 10R may have at least first and second operating modes such as ad hoc mode 84 and organized mode 86. Ad hoc mode 84 may sometimes be referred to herein as ad hoc state 84, self-organized mode 84, or low power mode 84. Organized mode 86 may sometimes be referred to herein as organized state 86, infrastructure mode 86, or high power mode 86. Relay device 10R may also optionally have additional operating modes such as beacon transmission mode 90 and/or synchronization signal transmission mode 88. In general, the operating modes of FIG. 5 consume an increasing amount of power and involve a greater amount of communication activity in the direction of arrow 82.

While in ad hoc mode 84, relay device 10R may monitor for the occurrence of the first trigger condition (e.g., while processing operation 60 of FIG. 3). Once the first trigger condition (switching criterion) has been met or has occurred (e.g., once relay device 10R detects occurrence of the first trigger condition), relay device 10R may transition from ad hoc mode 84 to organized mode 86, as shown by arrow 92.

As a first example, the first trigger condition (switching criterion) may be the reception of a wakeup signal in the D2D signals received at relay device 10R while operating in ad hoc mode 84. The wakeup signal may include a paging signal or a beacon signal (e.g., a preamble to one or more frames or symbols of D2D data) transmitted by one or more of the transmit devices 10T in range of relay device 10R. As examples, transmit devices 10T may transmit the wakeup signal when the transmit device is no longer in range of external communications equipment 12, when the transmit device detects an emergency (e.g., using sensors and/or software applications running on the transmit device) such as a fall, or an acute medical condition like atrial fibrillation or hypoglycemia, and/or in response to the user of the transmit device providing a user input instructing the transmit device to transmit the wakeup signal (e.g., to transmit an emergency message to the appropriate authorities). Relay device 10R may transition to organized mode 86 upon receipt of the wakeup signal (e.g., to monitor for broadcasts in addition to wakeup signals while in the organized mode). The transmit device(s) 10T that transmitted the wakeup signal may also transition to organized mode 86 upon transmission of the wakeup signal(s).

As a second example, the first trigger condition (switching criterion) may be a load-dependent trigger condition such as when relay device 10R detects that the D2D communications load at relay device 10R exceeds a threshold value (e.g., when a quality of service (QoS) or service level required for handling an expected or actual amount of data traffic exceeds a threshold level, when an amount of data traffic exceeds a threshold level, etc.). The wireless circuitry may support/handle a higher QoS/service level and/or may handle a higher amount of traffic in the organized mode than in the ad hoc mode, for example. Relay device 10R may, for example, monitor utilization of beacon resources while in ad hoc mode 84 (e.g., the percentage of occupied beacon slots or other slots over time) and may transition to organized mode 86 when the utilization of beacon resources exceeds a threshold value. The threshold value may correspond to when there is sufficient D2D traffic at relay device 10R to justify or warrant expending excess power organizing communications for the set 18 of transmit devices 10T.

As a third example, the first trigger condition (switching criterion) may be the reception of a user-specific paging signal in the D2D signals received at relay device 10R while operating in ad hoc mode 84. The user-specific paging signal may be a paging signal that specifically (explicitly) identifies or addresses relay device 10R. This may, for example, increase the communications efficiency of relay device 10R when a known transmit device 10T sends D2D signals. Relay device 10R may transition to organized mode 86 upon receipt of the user-specific paging signal. The transmit device(s) 10T that transmitted the user-specific paging signal may also transition to organized mode 86 upon transmission of the user-specific paging signal(s).

As a fourth example, the first trigger condition (switching criterion) may be the occurrence of a user-specific event that is detected by relay device 10R. Such an event may include loss of cellular connectivity, reception of a public warning system (PWS) message that can be forwarded, critical user vital statistics measured at relay device 10R or conveyed in received D2D signals, an application call, etc. Relay device 10R may transition to organized mode 86 upon detecting the occurrence of the user-specific event. Any other desired trigger conditions may be used.

If desired, a UE device that has sufficient power itself may always transition to organized mode 86 if the device or its user has detected an emergency. In these examples, the first trigger condition may occur when the UE device or its user identifies that an emergency situation has occurred and the UE device detects that it has a battery level exceeding a threshold level or that it is connected to power. If desired, a UE device such as relay device 10R may always activate organized mode 86 upon receipt of an emergency beacon or, upon receipt of an emergency beacon while the device has more power available than the UE device transmitting the emergency beacon or enough battery power to operate as a relay in organized mode for a predetermined number of minutes X (e.g., 60 minutes).

While in organized mode 86, relay device 10R may monitor for the occurrence of the second trigger condition (e.g., while processing operation 62 of FIG. 3). Once the second trigger condition (switching criterion) has been met or has occurred (e.g., once relay device 10R detects occurrence of the second trigger condition), relay device 10R may transition from organized mode 86 to ad hoc mode 84, as shown by arrow 94.

As a first example, the second trigger condition (switching criterion) may occur when relay device 10R and/or one or more transmit devices 10T detect that the higher overhead in organized mode 86 is no longer beneficial to the system (e.g., when D2D traffic levels have fallen below a threshold level, when network control data like the exchanged routing information indicates that higher overhead is no longer beneficial, etc.).

As a second example, the second trigger condition may occur when relay device 10R and/or one or more transmit devices 10T announces to the other user devices its intention to leave organized mode 86 and performing handover before switching to ad hoc mode 84.

As a third example, if organized mode 86 was entered because of a specific communication session (e.g., to forward an emergency message to emergency services), the second trigger condition may occur once the session has ended. Any other desired trigger conditions may be used.

For situations where organized mode 86 involves maintenance of a mesh network (e.g., requiring the exchange of network status and routing information), the UE device(s) may switch from organized mode 86 to ad hoc mode 84 once no replies, queries, and/or status updates have been received from other UE devices for a predetermined period of minutes Y (e.g., five minutes). If desired, if a UE device is power-limited (e.g., not plugged in, the battery level is below a threshold, etc.) and it detects that it takes part in exchanging control information but without exchanging payload (e.g., that the user/device itself has not been communicating in the last Z minutes such as 5 minutes), then the device may transition back to ad hoc mode 84. If desired, in the case that a UE device (e.g., relay device 10R) operates as a relay between an emergency user (e.g., transmit device 10T) and emergency services, that UE device may never switch to ad hoc mode 84 if information from either side was forwarded within the last W minutes (e.g., 20 minutes).

If desired, relay device 10R and/or transmit device 10T may enter beacon transmission mode 90 from ad hoc mode 84 as shown by arrow 96. This may occur when relay device 10R detects that the first trigger condition has occurred (e.g., prior to entering organized mode 86) and/or when transmit device 10T has a message (e.g., an emergency message) that it needs to transmit using D2D signals to relay device 10R. In beacon transmission mode 90, the relay device 10R and/or transmit device 10T may transmit beacons (e.g., preambles) to the other UE devices in the vicinity. Once the UE device that transmitted the beacon receives a response to the beacon from one or more of the other UE devices, the UE device may transition to organized mode 86 as shown by arrow 100. This may, for example, help to coordinate the operating mode across the UE devices in the vicinity of relay device 10R. In examples where transmit device 10T transmits the beacon, beacon transmission mode 90 may allow transmit device 10T to generate the occurrence of the first trigger condition at relay device 10R in ad hoc mode 84. Waiting for a response from relay device 10R before transitioning to organized mode 86 may help to synchronize the operating modes of the UE devices. If desired, the UE device that transmitted the beacon may fall back to beacon transmission mode from organized mode 86, as shown by arrow 102, to allow the transmitting UE device to transmit the beacon to additional UE devices in the vicinity that may still be in ad hoc mode 84.

If desired, the UE device(s) that transmit beacon signals (or subsequent broadcasts) in beacon transmission mode 90 may be extend the transmitted beacon signals to carry control information. For example, if the beacons include a preamble sequence such as a Zadoff Chu (ZC) sequence, different ZC roots or additional cover codes may be applied to the beacon to convey additional control information that helps to inform one or more other UE devices of the network configuration (e.g., the operating mode of one or more of the UE devices using D2D signals). The receiving UE device may recover this information by processing the preamble sequence. If the beacons involve two sequential transmissions (e.g., first a preamble to detect presence of the signal and an initial time and frequency synch and then transmission of control information including a checksum to exclude false positives), a larger control payload may be transmitted in the second transmission if desired.

The control information in the beacon may include information identifying the type of communication to be conveyed in the D2D signal message by the UE device that transmitted the beacon (e.g., whether the message is an emergency message, a non-emergency social message, or a message that includes paging information about which users or user groups are being paged). The control information may include organized mode status information such as information. For example, if the originating device has decided to switch to organized mode 86, the beacon may identify the decision and wake up other UE devices to make use of it. As another example, if the originating device has low battery and wants to limit its transmission, the device could request a potential relay to provide a synchronization signal (e.g., using a single bit or a metric indicating battery level so the relay can compare to its own battery level before making a decision).

If desired, relay device 10R and one or more transmit devices 10T may enter synchronization signal transmission mode 88 from organized mode 86, as shown by arrow 104. In synchronization signal mode 88, a primary UE device (e.g., relay device 10R or transmit device 10T) may transmit (broadcast) synchronization signals (e.g., in D2D signals) to any other UE devices in the vicinity (e.g., secondary UE devices). In other words, the primary UE device may transmit the synchronization signals in mode 88 whereas the secondary UE devices remain in organized mode 86. The synchronization signals may be used synchronize timing across the UE devices to coordinate the relay of messages in the D2D signals to and through relay device 10R. In organized mode 86, the secondary UE devices may scan for synchronization signals and/or other activity. If desired, the primary UE device may hand off the synchronization signal transmission role to another UE device, thereby making the other UE device a primary UE device and allowing the initial primary UE device to become a secondary device (e.g., allowing the primary UE device to transition from mode 88 back to organized mode 86 as shown by arrow 106). The primary UE device may also transition from mode 88 back to organized mode 86 via arrow 106 when the primary UE device battery level falls below a threshold level, when another UE device has a higher battery level, when the primary UE device is unplugged from power or moves off-grid, etc.

The examples described herein in which relay device 10R serves as a relay device to the network is merely illustrative. If desired, devices 10R and 10T (e.g., a set of devices 10) may operate in a purely peer-to-peer (P2P) setting. In such a setting, a set of devices may use ad hoc mode 84 to communicate using a relatively low traffic volume and/or a relatively low service level. At some point, one or more of these devices may decide to switch to organized mode 86 to operate more efficiently (e.g., by forming and/or maintaining a mesh network between peer devices). In these scenarios, external communications equipment 12, relay device 10R, and UE devices 10T may be replaced with any of the devices 10 in the set of devices (e.g., any of the devices 10 in the set of devices may perform the operations of devices 10R, 10T, and 12 as described herein).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. The methods and operations described above in connection with FIGS. 1-5 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 30 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

If desired, an apparatus may be provided that includes means to perform one or more elements or any combination of elements of one or more methods or processes described herein.

If desired, one or more non-transitory computer-readable media may be provided that include instructions to cause an electronic device, upon execution of the instructions by one or more processors of the electronic device, to perform one or more elements or any combination of elements of one or more methods or processes described herein.

If desired, an apparatus may be provided that includes logic, modules, or circuitry to perform one or more elements or any combination of elements of one or more methods or processes described herein.

If desired, an apparatus may be provided that includes one or more processors and one or more non-transitory computer-readable storage media comprising instructions that, when executed by the one or more processors, cause the one or more processors to perform one or more elements or any combination of elements of one or more methods or processes described herein.

If desired, a signal (e.g., a signal encoded with data), datagram, information element (IE), packet, frame, segment, PDU, or message may be provided that includes or performs one or more elements or any combination of elements of one or more methods or processes described herein.

If desired, an electromagnetic signal may be provided that carries computer-readable instructions, where execution of the computer-readable instructions by one or more processors causes the one or more processors to perform one or more elements or any combination of elements of one or more methods or processes described herein.

If desired, a computer program may be provided that includes instructions, where execution of the program by a processing element causes the processing element to carry out one or more elements or any combination of elements of one or more methods or processes described herein.

The foregoing is merely illustrative and various modifications can be made to the described embodiments. The foregoing embodiments may be implemented individually or in any combination.

What is claimed is:

1. An electronic device comprising:
one or more antennas; and
wireless circuitry configured to receive a device-to-device (D2D) signal from an additional electronic device using the one or more antennas and configured to transmit a message from the D2D signal to external communications equipment using the one or more antennas, wherein
the wireless circuitry is operable in a first operating mode in which the wireless circuitry consumes a first amount of power and supports a first service level,
the wireless circuitry is operable in a second operating mode in which the wireless circuitry consumes a second amount of power that is higher than the first amount of power and supports a second service level that is higher than the first service level, and
the wireless circuitry is configured to switch from the second operating mode to the first operating mode in response to an end of a communications session.

2. The electronic device of claim 1, wherein the electronic device is configured to switch from the first operating mode to the second operating mode in response to a switching criterion.

3. The electronic device of claim 2, wherein the switching criterion is different than the end of the communications session.

4. The electronic device of claim 1, wherein the wireless circuitry is configured, in the second operating mode, to transmit a synchronization signal to the additional electronic device using the one or more antennas.

5. The electronic device of claim 4, wherein the wireless circuitry is configured to handover transmission of the synchronization signal to another electronic device.

6. The electronic device of claim 1, further comprising:
one or more processors configured to identify control information transmitted by the additional electronic device from a cover code applied to the D2D signal.

7. The electronic device of claim 1, wherein the electronic device is a first user equipment (UE) device and the additional electronic device is a second UE device.

8. An electronic device comprising:
one or more antennas; and
wireless circuitry configured to receive a device-to-device (D2D) signal from an additional electronic device using the one or more antennas and configured to transmit a message from the D2D signal to external communications equipment using the one or more antennas, wherein
the wireless circuitry is operable in a first operating mode in which the wireless circuitry consumes a first amount of power and supports a first service level,
the wireless circuitry is operable in a second operating mode in which the wireless circuitry consumes a second amount of power that is higher than the first amount of power and supports a second service level that is higher than the first service level, and
the wireless circuitry is configured to switch from the second operating mode to the first operating mode in response to a lack of D2D message reception for a predetermined time period.

9. The electronic device of claim 8, wherein the electronic device is configured to switch from the first operating mode to the second operating mode in response to a switching criterion.

10. The electronic device of claim 9, wherein the switching criterion is different than the lack of D2D message reception for the predetermined time period.

11. The electronic device of claim 8, wherein the wireless circuitry is configured, in the second operating mode, to transmit a synchronization signal to the additional electronic device using the one or more antennas.

12. The electronic device of claim 11, wherein the wireless circuitry is configured to handover transmission of the synchronization signal to another electronic device.

13. The electronic device of claim 8, further comprising:
one or more processors configured to identify control information transmitted by the additional electronic device from a cover code applied to the D2D signal.

14. The electronic device of claim 8, wherein the electronic device is a first user equipment (UE) device and the additional electronic device is a second UE device.

15. A method of operating an electronic device to relay a message in device-to-device (D2D) signals received from one or more additional electronic devices to external communications equipment, the method comprising:
receiving, using a receiver in a first operating mode that consumes a first amount of power, the D2D signals;
receiving, using the receiver in a second operating mode that consumes a second amount of power greater than the first amount of power, the D2D signals; and
transitioning, using one or more processors, the receiver from the second operating mode to the first operating mode in response to D2D traffic at the electronic device falling below a threshold level.

16. The method of claim 15, further comprising:
transitioning, using the one or more processors, the receiver from the first operating mode to the second mode in response to a trigger condition.

17. The method of claim 16, wherein the trigger condition is different than the D2D traffic at the electronic device falling below the threshold level.

18. The method of claim 15, wherein the threshold level comprises a threshold percentage of occupied beacon slots as a function of time.

19. The method of claim 15, further comprising:
relaying, using a transmitter, the message to a communications satellite.

20. The method of claim 15, further comprising:
relaying, using a transmitter, the message to a wireless base station or a wireless access point.

* * * * *